United States Patent
Neal-Joslin

(10) Patent No.: US 8,402,511 B2
(45) Date of Patent: Mar. 19, 2013

(54) LDAPI COMMUNICATION ACROSS OS INSTANCES

(75) Inventor: Robert Raymond Neal-Joslin, Livermore, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 783 days.

(21) Appl. No.: 12/512,164

(22) Filed: Jul. 30, 2009

(65) Prior Publication Data
US 2011/0030042 A1 Feb. 3, 2011

(51) Int. Cl.
*G06F 7/04* (2006.01)
*H04L 29/06* (2006.01)

(52) U.S. Cl. ............... 726/3; 726/16; 713/164

(58) Field of Classification Search ....... 726/3; 713/164
See application file for complete search history.

(56) References Cited

U.S. PATENT DOCUMENTS

| | | | | |
|---|---|---|---|---|
| 6,665,674 | B1* | 12/2003 | Buchanan et al. | 1/1 |
| 6,978,367 | B1* | 12/2005 | Hind et al. | 713/167 |
| 2002/0083340 | A1* | 6/2002 | Eggebraaten et al. | 713/201 |
| 2005/0198501 | A1* | 9/2005 | Andreev et al. | 713/168 |
| 2005/0228981 | A1* | 10/2005 | Gavrilov et al. | 713/100 |
| 2006/0010232 | A1* | 1/2006 | Page et al. | 709/223 |
| 2006/0248343 | A1* | 11/2006 | Eggebraaten et al. | 713/182 |
| 2007/0073703 | A1* | 3/2007 | Quin | 707/10 |

* cited by examiner

*Primary Examiner* — Techane Gergiso

(57) ABSTRACT

Methods and apparatus for connecting a client on a first operating system to a server on a second operating system using LDAPI communication includes establishing privacy between the first and second operating systems, identifying the client to the server, identifying the server to the client to establish a trust by the client of the server, and sending LDAPI messages between the client and the server.

22 Claims, 4 Drawing Sheets

LDAPI COMMUNICATION ACROSS OS INSTANCES

BACKGROUND

Lightweight Directory Access protocol (LDAP) is a protocol used for looking up information from a directory server via a TCP/IP connection. Information that is often maintained on an LDAP directory server includes by way of example only and not by way of limitation email address and mail routing information, public security keys, contact lists, encryption certificates, pointers to printers and other services on a network, and the like. One of the primary purposes of an LDAP directory server is to provide centralized data management for a large, and often distributed, organization.

There are problems with managing trust relationships between the client and the directory server. Client and directory servers need to recognize each other or data can fall into the wrong hands. The trust issues are largely handled through public key infrastructure and password-based authentication in many instances. Deployments are usually fairly localized, so sharing of trust information regarding servers can be shared locally.

LDAPI (LDAP over a trusted domain socket, e.g., UNIX) is a way for a client to communicate with a server using a different transport mechanism. Instead of communicating over the internet, communication is all performed locally, that is, all communication is contained within an operating system instance. In LDAPI, the security domain and all trusts are localized. There is inherent trust between server and client, since both server and client exist on the same OS instance, and therefore trust is by definition. The complexities of setup are reduced. Authentication credentials can pre-exist, for example being set up in one place and being trusted locally. The ability to identify the server is made easier. The OS instance has the client and the server existing within one computer. A computer may have more than one OS inside it, but an LDAPI trust domain is limited to one OS instance.

The LDAPI transport mechanism has addressed the challenges of client and server authentication by only allowing communication between a client and server that exist on the same OS instance. In this situation, both the client and server are running inside an OS session. This OS session has an identity associated with it, which was authenticated before the OS session was created. When using LDAPI the LDAP client knows that the server is valid because the OS has protections that allow only a trusted administrator to set up an LDAPI socket. The directory server can discover the identity of the client by using an OS socket mechanism that identifies the client at the other end of the socket.

When the identity of the parties is known and managed by the OS, management and protection of the identity credentials is limited to the OS instance instead of all parties. Thus the cost of management is greatly reduced when LDAPI is used. In addition to intrinsic authentication, since messages between the LDAP client and LDAP server never leave the OS instance, both parties know that data sent between the client and server are not vulnerable to network eavesdropping when LDAPI is used.

The limitations of LDAPI eliminate some problems, but also limit the ability of LDAPI to be used except in very specialized circumstances, since it requires both the client and server exist in the same OS instance.

DETAILED DESCRIPTION

Today, distributed LDAP client applications contact a centralized LDAP directory server using the LDAP protocol. Typically these LDAP client applications do not reside on the same Operating System (OS) instance as the LDAP server, and thus communication occurs through a TCP/IP network. When this type of communication occurs, both the LDAP client application and LDAP directory server use some method to assert the validity of the identities on either end of this network connection. When the LDAP client retrieves information from the directory server the client validates the identity of the server, to assure that it is not receiving false information. The LDAP server validates the identity of the client to apply proper access control mechanisms such that data can be protected from unauthorized access. Similar security requirements exist for other operations, such as when a client writes data to the directory server. The LDAP protocol provides several mechanisms to perform this authentication process between the client and server.

There is often not, however, a pre-defined trust relationship between an LDAP client and an LDAP server. The credentials for a trust relationship must be pre-established and known by all involved parties before the two endpoints can communicate. In a distributed environment, setting up these pre-defined credentials creates at least two problems. First, distribution of these credentials to participating parties requires management overhead, which means an expense to the organization using the deployment. Second, protection of these authentication credentials by all parties is required to assure that a third party can not discover them and assume the role of either the client or server. Protection of these credentials also requires management overhead, especially when the number of LDAP clients is numerous.

Figure 1:
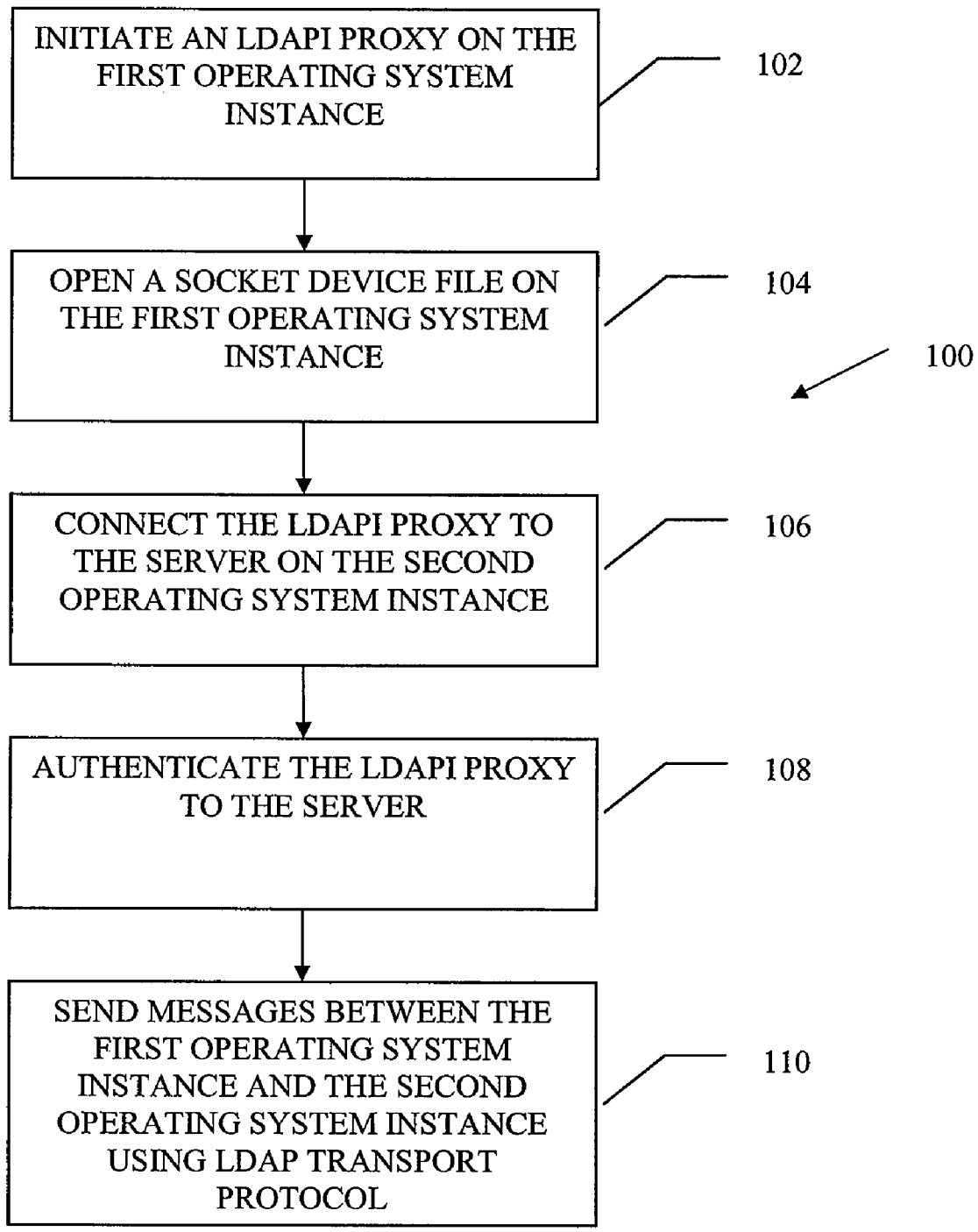
FIG. 1 is a flow chart diagram of a method according to an embodiment of the present invention.

A method 100 of connecting a client on a first operating system instance to a server on a second operating system instance using LDAPI communication is shown in FIG. 1. Method 100 includes, in one embodiment, initiating an LDAPI proxy on the first operating system instance in block 102, opening a socket device file on the first operating system instance in block 104, connecting the LDAPI proxy to the server on the second operating system instance in block 106, authenticating the LDAPI proxy to the server in block 108, and sending messages between the first operating system instance and the second operating system instance using LDAP transport protocol in block 110.

Figure 2:
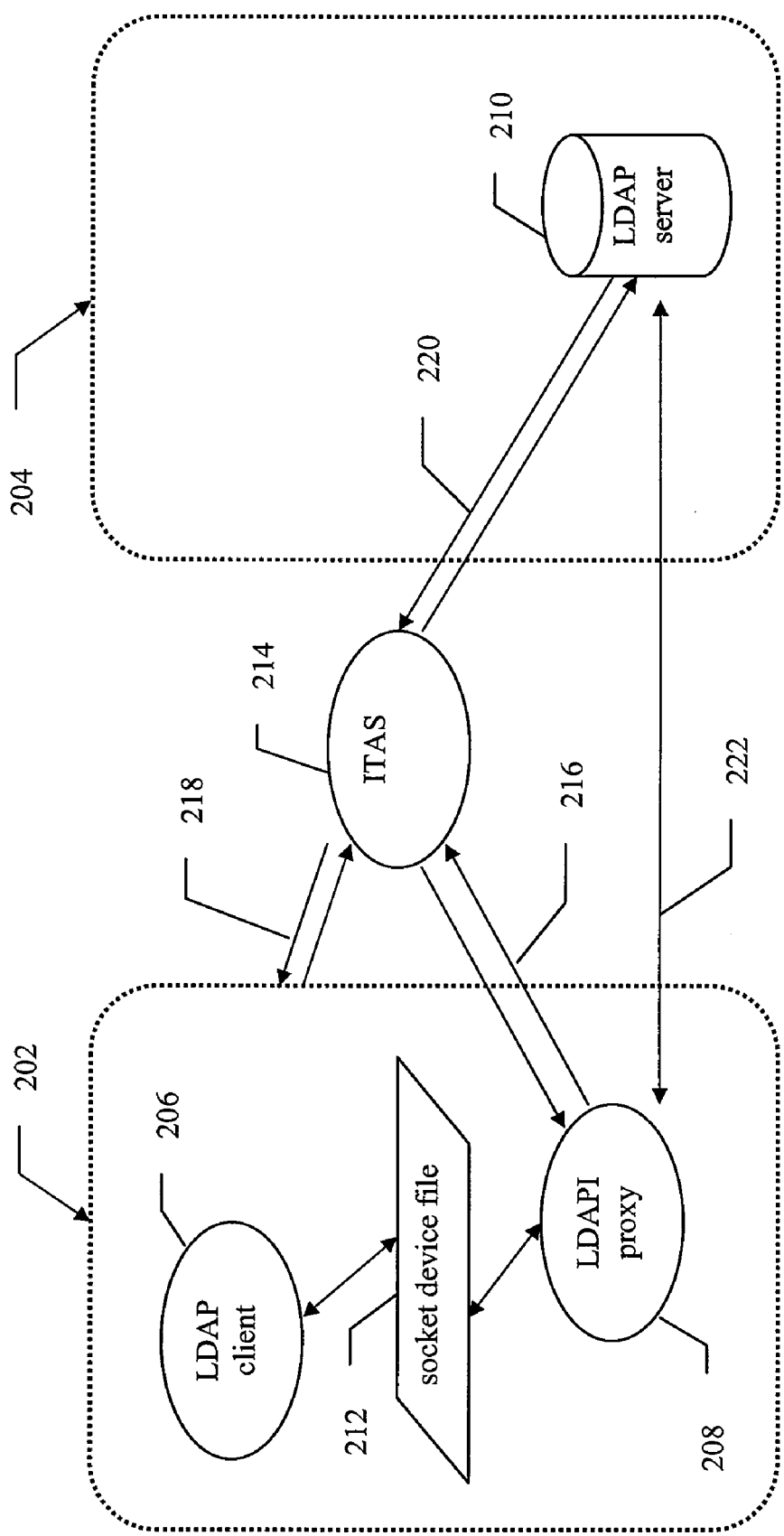
FIG. 2 is a block diagram of a system on which embodiments of the present invention may be practiced.

In one embodiment, a method and apparatus for establishing LDAPI communication between separate operating system instances is shown in greater detail in FIG. 2. Two different operating system (OS) instances, a client OS instance 202 and a server OS instance 204, are running. The client OS instance 202 runs an LDAP client 206 and a LDAPI proxy 208. The LDAPI proxy is set up in one embodiment by an OS administrator. The server OS instance 204 runs an LDAP server 210. A UNIX socket LDAPI device file 212 is created using the same methods that are used today by a directory server that currently supports the LDAPI interface such that the LDAPI proxy is the only process that is allowed to accept incoming messages from an LDAPI client and such that the LDAPI proxy can assert the identity of the LDAPI client sending the message. It should be understood that the creation of such device files is dependent on the operating system, and that the creation of such device files is within the scope of one skilled in the art.

The LDAPI proxy 208 is operated to perform at least two main tasks. First, the LDAPI proxy 208 meets trust requirements for secure communication between itself and the LDAP server 210. This is accomplished by the LDAPI proxy 208 making sure it can communicate securely with the LDAP server 210 and can identify that the LDAP server 210 is the server that it is actually intending to communicate with, for example by using a protocol such as TCP and standard transport layer security to establish the trust. In this example, the LDAP proxy 208 has its own copy of and is aware of a certificate that validates the identity of the LDAP server 210. The LDAPI proxy 208 establishes a communication channel securely with the LDAP server 210, meeting a first trust requirement between the LDAPI proxy and the LDAP server. This is because the LDAP client 206 trusts the creator of the LDAPI socket device file 212 and the socket device file 212 can only be served by the LDAPI proxy. Such establishing of trust ensures that the client can validate the identity of the server as well as assure message privacy and integrity. Second, the LDAP server 210 is made aware of the identity of the client by the LDAPI proxy 208. This is done in one embodiment by using identity translation and authentication service 214 (ITAS). Such establishing of identity of the client ensures the LDAP server 210 can apply proper access control restrictions on the data it serves.

The OS itself interacts with the ITAS. The ITAS sends user name and password information into the service which will register it. It may also authenticate the user for the OS. The ITAS communicates bi-directionally with the LDAPI proxy, the client OS instance, and the LDAP server, as indicated by arrows 216, 218, and 220 respectively. It should be understood that the ITAS in one embodiment is located within the client OS instance. The ITAS in one embodiment is a database containing information allowing the mapping of identity of the LDAP client 206 as known to the OS to a form of the same identity as known to the LDAP server 210. It may store password and user- or client-name information for multiple clients, identities and information to prove identification, and the like. This allows the LDAPI proxy 208 to determine what identity the LDAP server 210 has assigned to the LDAP client 206 within the LDAP server 210, and to use that identity with credential information to establish LDAPI communication as if the LDAP client 206 were on the same OS instance as the LDAP server 210. The ITAS 214 resides in one embodiment on the client OS instance 202. The ITAS 214 can also reside in various embodiments on the server OS instance 204, or on a third party (not shown).

In a first more specific method of establishing LDAPI communication between two separate OS instances, shown with respect to the structure of FIG. 2, the LDAPI proxy 208 has sufficient privilege to translate the identity number as known to the OS instance 202 of the particular LDAP client 206 that is to connect via LDAPI to the LDAP server 210 into the identity that is known by the LDAP server 210. The LDAPI proxy 208 retrieves credentials sufficient to emulate the LDAP client 206, for example, retrieving the identity and password from the ITAS 214 and the database stored thereat using the message request shown in 216. An initial message from the LDAPI proxy 208 is then sent via TLS, SSL, SASL, or the like to the LDAP server containing an LDAP authorization request, which includes the identity discovered from the ITAS 214, as indicated at 222. The LDAPI proxy 208 uses the retrieved credential information to represent the LDAP client 206 to the LDAP server 210 as the LDAP client itself, within the boundaries of trust obtained through LDAPI communication, even though the LDAP client 206 is on a separate OS from the LDAP server 210. The LDAP server 210 treats the LDAPI proxy as an actual LDAP client since the LDAPI proxy has provided all the proper credentials as known and trusted by the LDAP server 210. Since in one embodiment the ITAS resides on the LDAP server OS instance itself, and since the LDAPI proxy has access thereto in a trusted relationship, the LDAP server trusts the LDAPI proxy.

Communications 216, 218, and 220 are accomplished as follows. In communication 216, the LDAPI proxy 208 has an identity of an LDAP client 206 as known to the OS instance. The LDAPI proxy 208 retrieves authentication credentials that the directory server maintains for the specific client identity from the ITAS, that is, the OS representative identity of identity gets translated into the LDAP server representative of the identity, and validating credentials are returned via 216 so that authentication can occur between the LDAPI proxy 208 and the LDAP server 210.

In communication 218, the client OS 202 sends to the ITAS 214 the identity of the user performing authentication, as known to the OS, so that the ITAS 214 knows which directory identity to associate with a session that is occurring between LDAP client 206 and LDAP server 210 via LDAPI proxy 208. When the client OS 202 initiates an authentication for a session, it sends identity information, including validating credentials, about the client to the ITAS 214. The ITAS 214 uses this OS identity information to obtain a translation to the directory identity. The validating credentials are retained so that the LDAPI proxy 208 may use the credentials in future requests on behalf of the LDAP client 206. When the LDAP client 206 wants to send a message to the LDAP server 210, the LDAPI proxy 208 knows the client identity (such as client number or the like) and asks the ITAS 214 for translation information as well as validating credentials. When the information is received, that information is used by the LDAPI proxy 208 to authenticate to the LDAP server 210. Before authenticating the LDAP client 206, the ITAS 214 captures the client identity via the communication 218.

In one embodiment, in order to perform the translation performed by the ITAS 214 for communication 218, the ITAS 214 communicates with the LDAP server 210 in message 220. Once the OS client identity is known via communication 218, the ITAS generates message 220 which contains an LDAP search operation which contains an LDAP search filter which uses the OS identity to discover the LDAP identity of the OS identity for the LDAP client 206. Optionally, the ITAS 214, using the aforementioned discovered directory identity performs an authentication operation with the LDAP server 210, to assert the validity of the identity of the LDAP client 206. The ITAS 214 may pass the results of this authentication to the OS instance 202 in the response to message 218.

Once a private, authenticated and integrity protected channel is established between the LDAPI proxy (representing the LDAP client) and the LDAP server, LDAPI requirements are met. This allows the LDAP client 206 to connect via an LDAPI protocol without separately having to establish trust relationships involving additional overhead and management.

The LDAPI proxy 208 creates and manages the LDAPI socket device file 212. Before proceeding, an LDAP client, such as LDAP client 206, verifies the integrity of the device file 212 by verifying that the device file 212 was created by an OS administrator. The LDAP client 206 uses the device file 212 to connect to and communicate with the LDAP (directory) server 210 as follows. When the LDAP client 206 opens the LDAPI device file 212, the LDAPI proxy 208 connects to the LDAP server 210 using a secure socket layer (SSL) or transport layer security (TLS) connection 222, for example, providing data confidentiality and integrity. The connection between the LDAPI proxy 208 and the LDAP server 210 is allocated by the LDAPI proxy 208 on behalf of the LDAP client 206 and is used to represent communications to/from that particular client.

The LDAPI proxy 208 identifies the client that originally opened the LDAPI socket device file 212, and uses ITAS 214 to discover the representative identity and validating credentials, such as a password, of the LDAP client 206 as known by the LDAP server 210. The LDAPI proxy 208 retrieves authentication credentials used in and required by the LDAP server 210. It then performs authentication to the LDAP server 210 using the discovered identity. After authentication, all messages generated by the LDAP client 206 are transmitted though the LDAPI proxy 208 and further transmitted directly to the LDAP server 210 through the connection established when authentication was performed. When the LDAP client 206 closes the LDAPI socket device file 212, the LDAPI proxy 209 closes the representative connection established with the LDAP server 210.

Figure 3:
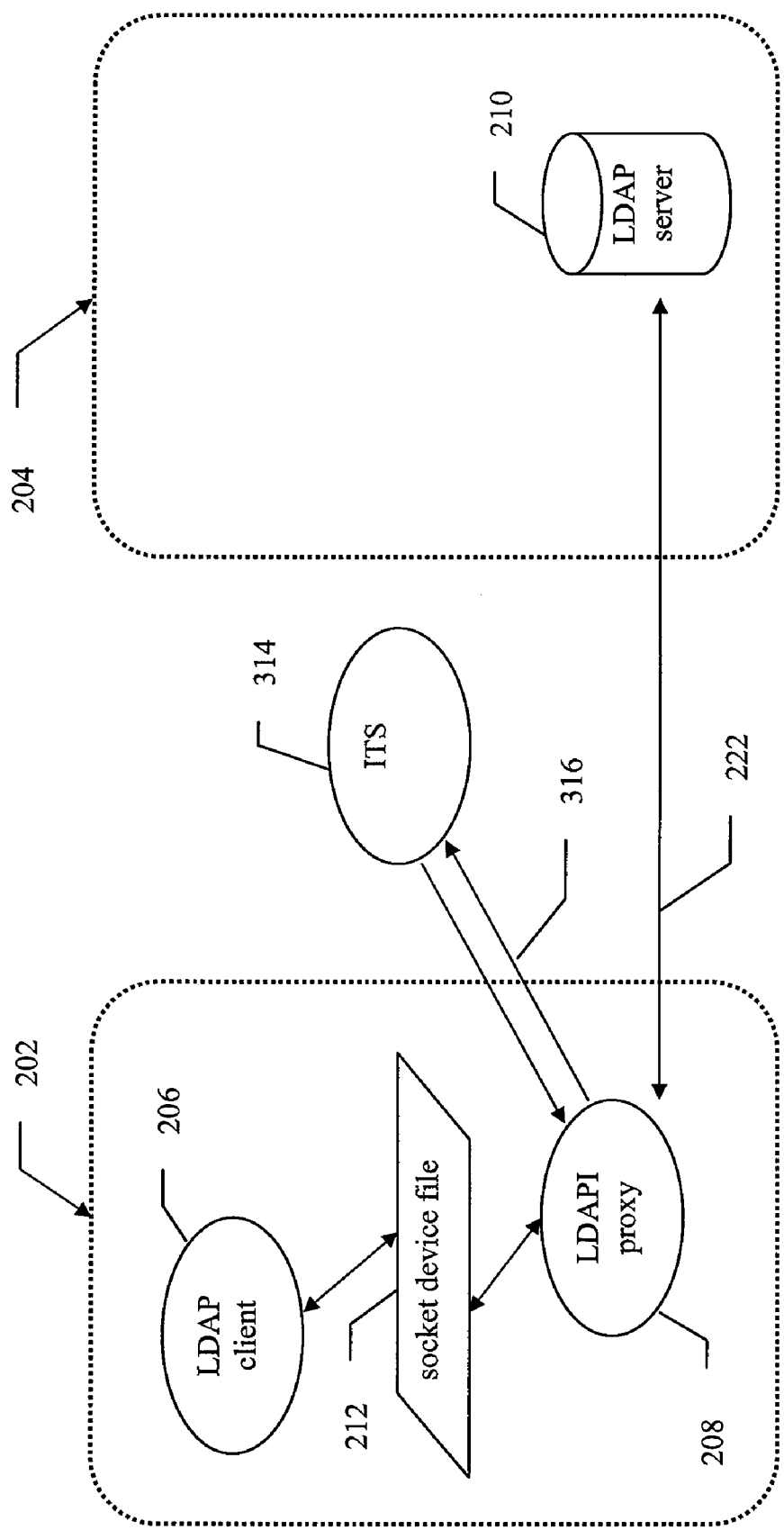
FIG. 3 is a block diagram of another system on which embodiments of the present invention may be practiced.

In another more specific method of establishing communication, shown in FIG. 3, the identity of the LDAP client 206 is represented to the LDAP server 210 in a different way. Instead of the LDAPI proxy retrieving a credential from an identity translation and authentication service (ITAS) 214, the LDAPI proxy either directly, or through an Identity Translation Service 314, discovers the directory server's representation of the identity, but does not need to have access to validating credentials, such as a password. Instead, the LDAPI proxy 208 is granted privileges to emulate a client (such as LDAP client 206) directly. Only some LDAP servers 210 support such a method (known for example as the "LDAP Proxied Authorization Control"), so this variation is limited to those LDAP servers that support such a function. An initial message from the LDAPI proxy 208 is sent via TLS, SSL, SASL, or the like to the LDAP server containing an LDAP authorization request, as indicated at 222.

The method of the LDAPI proxy 208 being granted privileges to emulate a client directly involves, in one embodiment, proxied authorization control. A holder of a proxied authorization control is trusted by a directory server to provide a proper identity for the ultimate client. This allows direct sending of a client identity to the LDAP server 210 from the LDAPI proxy 208 without re-authentication. The LDAPI proxy knows what identity the LDAP server 210 has assigned to the specific client, as described above with respect to FIG. 2, and can therefore send all requests directly to the LDAP server 210 along with the proxied authorization control, without requiring individual authentication of an LDAP client (such as LDAP client 206).

In operation, LDAPI communication in this method is established as follows. An LDAPI proxy (such as proxy 208) is initiated on the client OS instance 202. The LDAPI proxy is set up in one embodiment by an OS administrator. The LDAPI proxy 208 creates and manages an LDAPI socket device file 212. Before proceeding, an LDAP client (such as LDAP client 206) verifies the integrity of the device file 212 by verifying that the device file was created by an OS administrator. LDAP clients use the device file to connect to and communicate with the LDAP server 210 as follows. When the client opens the LDAPI device file 212, the LDAPI proxy 208 connects to the LDAP server 210 using an SSL or TLS connection 222, for example. The connection between the LDAP proxy 208 and the LDAP server 210 is allocated by the LDAPI proxy 208 on behalf of the LDAP client 206 and is used to represent communications to/from that particular client. The LDAPI proxy 208 authenticates to the LDAP server 210 on the connection using an administrative identity that has sufficient rights to use the LDAP Proxied Authorization Control (RFC4370).

The LDAPI proxy 208 identifies the LDAP client (such as client 206) that originally opened the LDAPI socket device file 212, and then uses an identity translation service (ITS) 314 to discover the representative identity of the client as the LDAP server 210 knows it. The ITS 314 communicates bi-directionally with the LDAPI proxy 208 as indicated by arrows 316. It should be understood that the ITS 314 in one embodiment is located within the client OS instance 204. After discovering the representative identity, the LDAPI proxy 208 retains the identity and its association with the established connection. All messages generated by the LDAP client 206 are transmitted directly to the LDAP server 210 through the LDAPI proxy 208 using the associated connection. Each message from the LDAPI proxy 208 to the LDAP server 210 is amended with the LDAP proxied authorization control using the representative identity. When the client closes the LDAPI device file 212, the LDAPI proxy 208 closes the representative connection established with the LDAP server 210. The ITS 314 resides in one embodiment on the client OS instance 202. The ITS 314 can also reside in various embodiments on the server OS instance 204, or on a third party (not shown).

Figure 4:
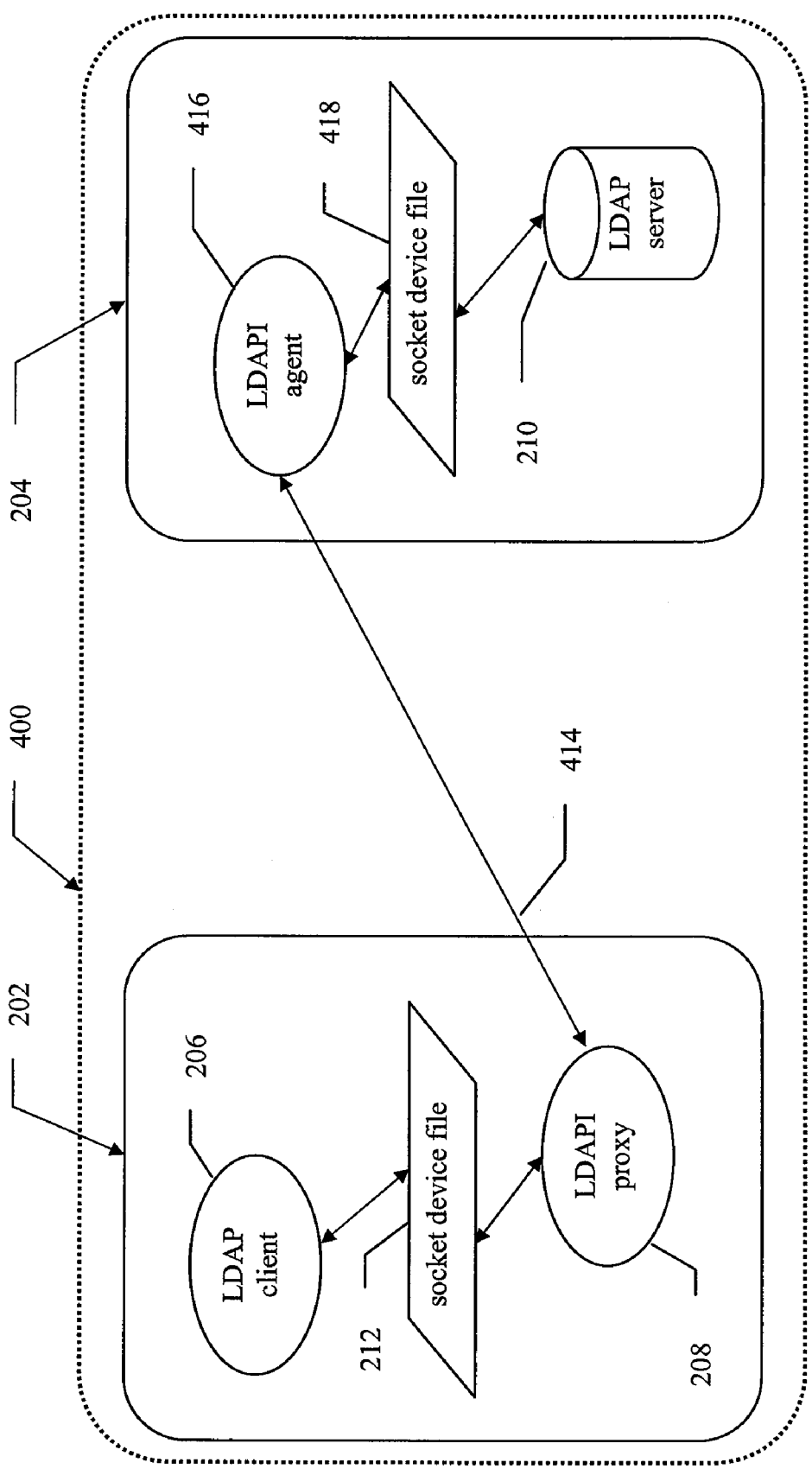
FIG. 4 is a block diagram of another system on which embodiments of the present invention may be practiced.

In another more specific method of establishing communication, shown in FIG. 4, the identity of the LDAP client 206 is represented to the LDAP server 210 in another different way. Instead of the LDAPI proxy retrieving a credential from an identity translation and authentication service (ITAS) 214 or identity translation service (ITS) 314, the LDAPI proxy 208 uses an encrypted connection or channel 414 between the LDAPI proxy 208 and an LDAPI agent 416 residing on the server OS instance 204. For the LDAPI agent 416 to be trusted by the LDAPI proxy 208, a method similar to using SSL or TLS as described in other embodiments herein is also applicable to this channel. Translation services are provided in this embodiment by a shared common identity name space 400 of the client (202) and server (204) OS instances, such as in LDAPI socket device file 212 residing on the client OS instance 202 and LDAPI socket device file 418 residing on the server OS instance 204. The LDAPI proxy 208 transmits the identity of an LDAP client (such as LDAP client 206) on client OS instance 202 to LDAPI agent 416 on server OS instance 204 via the encrypted connection 414.

Assuring that a shared common identity name space 400 is accomplished in one embodiment by having an administrator configure this relationship to ensure that the name space is common before performing such a configuration. In one alternative embodiment, the agent and proxy verify that they are part of the same name space. The LDAPI proxy emulates the LDAP client to the LDAPI agent 416, which in turn emulates that identity when it opens LDAPI socket device file 418 on the server OS instance 204. In this configuration, the LDAP server 210 recognizes the identity from its own mapping between user identities inherent in existing LDAPI implementations, since the LDAPI agent 416 and LDAPI socket device file 418 reside on the same OS instance (204) as the LDAP server 210.

The LDAPI agent 416 may open multiple connections, or sub-agents, so that any number of clients on the client OS instance 202 may use the LDAPI proxy 208 to establish LDAPI communication between the client OS instance 202 and the server OS instance 204. These multiple connections look like a number of local LDAPI connections to the LDAP server 210.

In operation, LDAPI communication in this method is established as follows. An LDAPI proxy 208 is initiated on the LDAP client OS instance 202. The LDAPI proxy 208 is set up in one embodiment by an OS administrator. The LDAPI proxy 208 creates and manages an LDAPI socket device file 212. Before proceeding, an LDAP client (such as client 206) verifies the integrity of the LDAPI socket device file 212 by verifying that it was created by an OS administrator. The LDAP client 206 uses the LDAPI socket device file 212 to connect to and communicate with the LDAP directory server 210 as follows. When the LDAP client 206 opens the LDAPI socket device file 212, the LDAPI proxy 208 connects to the LDAPI agent 416, which resides on the same host (204) as the LDAP server 210. The connection 414 between the LDAPI proxy 208 and the LDAPI agent 416 is protected, such as through SSL or the like such that that connection can be secured and the identity of the LDAPI proxy and LDAPI agent can be validated. The LDAPI proxy 208 and the LDAPI agent 416 verify each other's identity. This validation may be done, for example, using client and server SSL certificates or the like.

After establishing message privacy and integrity as well as the identities of the LDAPI proxy 208 and LDAPI agent 416, the next message between the LDAPI proxy 208 and the LDAPI agent 416 contains, for example, the portable operating system interface for Unix (POSIX) user ID of the client that opened the LDAPI proxy 208. The LDAPI agent 416 creates a sub-agent and sets the sub-agent's effective user ID to the POSIX user ID of the LDAP client 206. The LDAPI agent 416 opens the LDAPI socket device file 418 on that OS instance (104 in one embodiment). The server OS instance LDAPI socket device file 418 functions as a direct link to the LDAP server 210 and is treated as being managed by the LDAP server 210 itself or by a representative agent. All messages sent by the LDAP client 206 on the client OS instance 202 are delivered by the LDAPI proxy 208 to the LDAPI agent 416 (and sub-agent as necessary), which are further delivered directly to the LDAPI socket device file 418 on the servers OS instance 204.

Response messages from the LDAP server 206 are returned from the LDAPI agent 416 to the LDAPI proxy 208 via connection 414, and are further delivered to the LDAP client 206 by the LDAPI proxy 208 via the LDAPI socket device file 212. When the LDAP client 206 closes the LDAPI socket device file 212, the LDAPI proxy 208 closes the representative connection 414 established with the LDAP directory server 210. In this embodiment, all participating OS instances use the same name space for management of OS identities.

It should be understood that client OS instance and server OS instance are terms used in the descriptions herein, but that other OS instances are amenable to use with the apparatus and methods described herein without departing from the scope of the disclosure.

What is claimed is:

1. A method of connecting a client on a first operating system instance to a server on a second operating system instance using lightweight directory access protocol over a trusted domain (LDAPI) communication, comprising:
    initiating an LDAPI proxy on the first operating system instance;
    opening a socket device file on the first operating system instance;
    connecting the LDAPI proxy to the server on the second operating system instance;
    authenticating the LDAPI proxy to the server; and
    sending messages between the first operating system instance and the second operating system instance using lightweight directory access protocol (LDAP) transport protocol.

2. The method of claim 1, wherein connecting further comprises connecting the LDAPI proxy and the server directly via a secure communication channel.

3. The method of claim 1, wherein connecting further comprises connecting the LDAPI proxy to the server through an LDAPI agent.

4. The method of claim 3, wherein connecting further comprises authenticating the LDAPI agent to the server via an LDAPI socket device file on the second operating system instance.

5. The method of claim 4, and further comprising opening a unique sub-agent to the LDAPI agent for each client to be connected to the server.

6. The method of claim 5, wherein authenticating further comprises:
    sending a client identity from the LDAPI proxy to the LDAPI agent; and
    opening the sub-agent with an effective user identity matching the client identity.

7. The method of claim 6, wherein sending a client identity further comprises sending a portable operating system interface for Unix user identity.

8. The method of claim 1, wherein authenticating further comprises:
    retrieving a representative identity and authorization credentials for the client as known by the server; and
    authenticating the client to the server using the retrieved representative identity.

9. The method of claim 8, wherein the representative identity is retrieved from an identity translation and authorization service.

10. The method of claim 9, wherein the identity translation and authorization service resides on the first operating system instance.

11. The method of claim 1, wherein authenticating further comprises:
    retrieving a representative identity for the client as known by the server; and
    authenticating the LDAP client to the server using the representative identity and an administrative identity with sufficient privilege to use LDAP proxied authentication control.

12. The method of claim 1, wherein sending messages further comprises:
    sending each message from the client through the LDAPI proxy directly to the server over a connection established by connecting the LDAPI proxy to the server on the second operating system instance.

13. The method of claim 1, wherein sending messages further comprises:
    sending each message from the client through the LDAPI proxy directly to the server with a proxied authorization control from the LDAPI server over a connection established by connecting the LDAPI proxy to the server on the second operating system instance.

14. The method of claim 1, wherein sending messages further comprises:
    sending each message from the client through the LDAPI proxy to the server through the LDAPI agent.

15. The method of claim 1, and further comprising:
closing a connection established by connecting the LDAPI proxy to the server on the second operating system instance when the socket device file is closed.

16. A method of connecting a client on a first operating system to a server on a second operating system using lightweight directory access protocol over a trusted domain (LDAPI) communication, comprising:
establishing privacy between an LDAPI proxy on the first operating system and the server or an LDAPI agent on the second operating system;
identifying the client to the server;
identifying the server to the client to establish a trust by the client of the server; and
sending LDAPI messages between the client and the server.

17. The method of claim 16, and further comprising:
initiating the LDAPI proxy on the first operating system instance;
opening a socket device file on the first operating system instance;
connecting the LDAPI proxy to the server on the second operating system instance;
authenticating the LDAPI proxy to the server; and
sending messages between the client and the server between the LDAPI proxy and the server.

18. The method of claim 16, and further comprising:
initiating the LDAPI proxy on the first operating system instance;
opening a socket device file on the first operating system instance;
connecting the LDAPI proxy to an LDAPI agent on the second operating system instance;
authenticating the LDAPI agent to the server; and
sending messages between the client and the server between the LDAPI proxy, the LDAPI agent, and the server.

19. A computer system, comprising:
a memory device; and
a lightweight directory access protocol (LDAP) server to operate on a server operating system instance operating from the memory, and configured to accept connections from a client operating system instance according to a method comprising:
identifying the client to the LDAP server;
identifying the LDAP server to the client to establish a trust by the client of the server; and
sending lightweight directory access protocol over a trusted domain (LDAPI) messages between the client and the LDAP server.

20. The system of claim 19, and further comprising:
an LDAPI agent to operate on the server operating system instance, the LDAPI agent configured to establish privacy between the LDAP server operating system instance and an LDAPI proxy on the client operating system instance.

21. The system of claim 20, and further comprising an LDAPI socket device file to authenticate the LDAPI agent to the server.

22. A system, comprising:
a memory device; and
a client operating on a client operating system instance operating from the memory, and configured to connect to a lightweight directory access protocol (LDAP) server operating system instance via a lightweight directory access protocol over a trusted domain (LDAPI) transport protocol according to a method comprising:
establishing privacy between the client operating system instance and the LDAP server operating system instance;
identifying the client to the LDAP server;
identifying the LDAP server to the client to establish a trust by the client of the server; and
sending LDAPI messages between the client and the LDAP server.

* * * * *